March 23, 1965  G. H. RAWCLIFFE  3,175,143
THREE PHASE, POLE-CHANGING ROTARY ELECTRIC MACHINE
Filed April 11, 1962  3 Sheets-Sheet 2

INVENTOR
Gordon Hindle Rawcliffe
BY
Stevens, Davis, Miller & Mosher
ATTORNEY

United States Patent Office 3,175,143
Patented Mar. 23, 1965

3,175,143
THREE PHASE, POLE-CHANGING ROTARY
ELECTRIC MACHINE
Gordon Hindle Rawcliffe, Clifton, Bristol, England, assignor to National Research Development Corporation, London, England
Filed Apr. 11, 1962, Ser. No. 186,700
Claims priority, application Great Britain, Apr. 20, 1961, 14,243/61
6 Claims. (Cl. 318—224)

This invention relates to rotary electric machines, particularly to three-phase, alternating current pole-changing electric motors adapted to run at two alternative speeds.

It is well known to provide pole-changing A.C. electric motors having either separate sets of phase windings providing alternative pole-numbers or having a single set of phase-windings, with suitable connections to the coils brought out to a multiple switch, so that the single set of phase-windings can be switched to provide alternative pole-numbers. The most common arrangements provide alternative pole-numbers in the ratio 2:1, and hence alternative operating speeds in the reverse ratio.

Recently, a new principle for providing alternative pole-numbers in a rotary electric machine with a single set of phase-windings has been developed. This principle is known as "Pole-Amplitude Modulation" and has been described in two papers by Professor G. H. Rawcliffe and others, the earlier entitled "Induction Motor Speed-Changing by Pole-Amplitude Modulation" in the Proceedings of the Institution of Electrical Engineers, vol. 105, Part A, No. 22, August 1958, and the later entitled "Speed-Changing Induction Motors—Further Developments in Pole-Amplitude Modulation" in the Proceedings of the Institution of Electrical Engineers, vol. 107, Part A, No. 36, December 1960.

While the above-mentioned references give a full explanation of the general theory of pole-amplitude modulation, it may briefly be said here that a 3-phase, A.C. machine having a single set of three phase-windings wound to provide a first pole-number may be adapted to operate at an alternative pole-number, in a ratio less than 2:1, if a pole-amplitude modulation wave, that is to say a cyclical pattern of reconnection of the coils, is applied to each phase-winding, the three modulating waves being relatively spaced by 120° around the axis of the machine.

The pole-amplitude modulation of each phase-winding is effected by switching successive portions of the phase-winding around the periphery of the machine so that, in the modulated connection, one portion is reversed in polarity and one portion retains its original polarity for each complete cycle of the modulating wave.

A rotary electric machine according to the prior art referred to may be defined as a rotary electric machine having a three-phase winding providing a first pole-number of P pole-pairs and an alternative pole-number of either (P+M) or (P−M) pole-pairs, having three phase-windings sequentially arranged around an axis, the electrical phase-sequence A, B, C and phase-band sequence +A −C +B −A +C −B defining a reference sense of rotation around said axis, said phase-bands comprising coils connected together in each phase-winding to provide 2 P poles, means for connecting selected ones of said coils in an alternative manner to modulate the relative amplitudes of said 2 P poles according to three-pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C or in the phase sequence A, C, B in the said reference sense of rotation, as said alternative pole-number is (P+M) pole-pairs or (P−M) pole-pairs, respectively.

In addition, further expedients are known to ensure that the amplitudes of the poles, in the modulated connections, are not uniform but follow more nearly a sinusoidal amplitude distribution in each modulating wave. To this end, one pole may be omitted at one end of each modulation half-cycle, or both end poles may be reduced in amplitude or the machine may be wound originally as a fractional-slot machine to provide a sinusoidal distribution of the pole amplitudes for both the modulated and unmodulated connections.

For alternative pole-number combinations where neither the unmodulated pole-number for which the machine is wound nor the modulated pole number obtained by pole-amplitude modulation is a multiple of three poles, exactly the same pattern of reconnection of the coils may be used for each of the three phase-windings. Such a system is known as symmetrical pole-amplitude modulation, because the distribution of coils, in both the unmodulated and modulated connections, is always symmetrical about the mid point of each half phase-winding.

Where either pole-number is a multitude of three, a more elaborate arrangement is required for two of the three phase windings. Such a system is known as asymmetrical pole-amplitude modulation because, in the modulated connection the distribution of coils is not symmetrical about the mid points of each half of these two phase-windings.

The present invention, however, relates to machines using symmetrical pole-amplitude modulation, that is where neither pole-number is three pole-pairs or a multiple thereof.

Many of the known arrangements for symmetrical pole-amplitude modulation required the omission of coils in the modulated connection. In particular, machines wound with an integral number of slots per pole for the unmodulated pole number required the omission of coils to provide the sinusoidal amplitude distribution of the poles, in each modulation half-wave, in the modulated connection.

The coils removed from circuit on modulation have had to be wound with half the number of turns, of double-section wire, compared with the remainder of the coils. This, though not a serious difficulty, can be objectionable on either of two grounds:

(a) In small mass-produced machines, it involves extra care in manufacture, to make certain that these special coils are inserted in the proper slots. The connections are also a little more complicated to make.

(b) For large machines, especially at low voltages, the number of conductors is small, and may be an odd number. If this requires a small odd number of turns per coil, it is clearly impossible to wind special coils with half the number of turns.

The object of the present invention is to provide an improved pole-amplitude modulation arrangement, for a uniformly-distributed integral slot machine, enabling all coils to be connected in circuit for both the unmodulated and modulated connections.

Accordingly the present invention provides a rotary electric machine having a three-phase winding providing a first pole-number of P pole-pairs and an alternative pole-number of either (P+M) or (P−M) pole-pairs, having three phase-windings sequentially arranged around an axis, the electrical phase-sequence A, B, C and phase-band sequence +A −C +B −A +C −B defining a reference sense of rotation around said axis, said phase-bands comprising coils connected together in each phase-winding to provide 2P poles, means for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the said poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C or in the phase sequence A, C, B in the said reference sense of rotation, as said alternative pole-number is (P+M) pole-pairs or (P−M) pole-pairs, respectively, wherein neither said first pole-number nor said alternative pole-number is three pole-pairs or a multiple thereof, wherein the said three-phase winding is an integral-slot winding and wherein the pole-amplitude of a pole at one end of each half of each phase-winding or the poles at both ends of each half of each phase-winding is reduced in the alternative, that is to say modulated, connection, said pole-amplitude reduction being effected by reversal in current-carrying sense of selected coils relatively to all the remaining coils of the coil-groups providing said poles of reduced amplitude, whereby all coils of all phase-bands are included in circuit for both the first and the alternative connections.

From the preceding paragraph, it will be readily understood that, in the modulated connection, when a sinusoidal distribution of pole-amplitudes in each modulation half-wave is desired, corresponding to the omission of one pole at one end of each half-wave or, preferably, the reduction of pole-amplitude at both ends of each half-wave, the desired distribution is obtained by connecting coils of the same coil-group concerned in opposition to each other, in current-carrying sense, so that the resultant pole-amplitude is reduced thereby.

Suppose for example, that according to earlier techniques it was desired to remove from circuit two adjacent coils, in the same coil-group. Substantially the same effect is obtained in a machine according to the present invention by leaving both coils in circuit and reversing one coil with respect to the other. Since the two coils are adjacent, they almost exactly neutralise each other when one is reversed, though there is a very small vector difference between the E.M.F. of the two coils. There is also a very small high-harmonic component added to the M.M.F. wave at that point. Which of two coils it is the better to reverse, and which to leave connected in the original sense, can be determined by examination of the vector diagram or of the equations for the whole winding.

In general, it is found that the choice of the coil for reversal should be so made that, as nearly as possible, a regular and symmetrical modulating wave is obtained for the winding as a whole.

When it is desired to make two coils mutually neutralising, and these two coils form part of a larger group of coils, that coil which lies next to the rest of the coil-group should be connected in the same sense as the rest of the group. The other coil of the pair should be reversed.

Apart from the simplification in manufacturing specifications which an arrangement according to this invention makes possible, one very substantial design advantage arises in regard to the ratio between the flux-densities for the unmodulated and modulated pole-numbers. The variation in the performance of a particular design, for a given flux-density, between that when coils are omitted from circuit and that when coils are arranged for mutual neutralisation, is very slight. It is in relation to obtaining full flux-density for both speeds that difficulty sometimes arises, which can be resolved by the technique according to this invention.

The usual switching connections for machines using pole-amplitude modulation are parallel-star/series-delta (or series-star). This arrangement requires six terminals. However, it is not possible with the 6-terminal arrangement to exclude coils from circuit in the parallel-star connection. This has necessitated the use of parallel-star for the unmodulated connection, and series-delta (or series-star) for the modulated connection, for any modulation scheme which involves the exclusion of some coils on modulation.

For the same winding factor, parallel-star connections give a higher flux per pole than series-delta; and if the winding factor is reduced, the flux per pole is increased still further. This makes it advantageous to use parallel-star connections for the smaller pole-number; since the increase in flux per pole is acceptable when the number of poles is reduced in proportion. The higher pole-number is then provided by either series-delta or series-star connection.

However, it is usually preferred to reduce the pole-number by modulation, so that the parallel-star connection is particularly advantageous for the modulated pole-number. In this event, the unmodulated, higher pole-number is provided preferably by series-delta connection.

Avoidance of coil-omission on modulation is therefore a considerable advance, especially when it is used to provide modulation to reduce pole-number, with series-delta/parallel-star connections.

In order that the invention may be readily carried into effect, one embodiment will now be described in detail, by way of example, with reference to the accompanying drawings, in which:

FIG. 1 shows the coil winding arrangement of a uniformly-distributed integral-slot machine providing 8 poles on a 72-slot frame with three coils per coil-group in the unmodulated connection.

Figure 1:
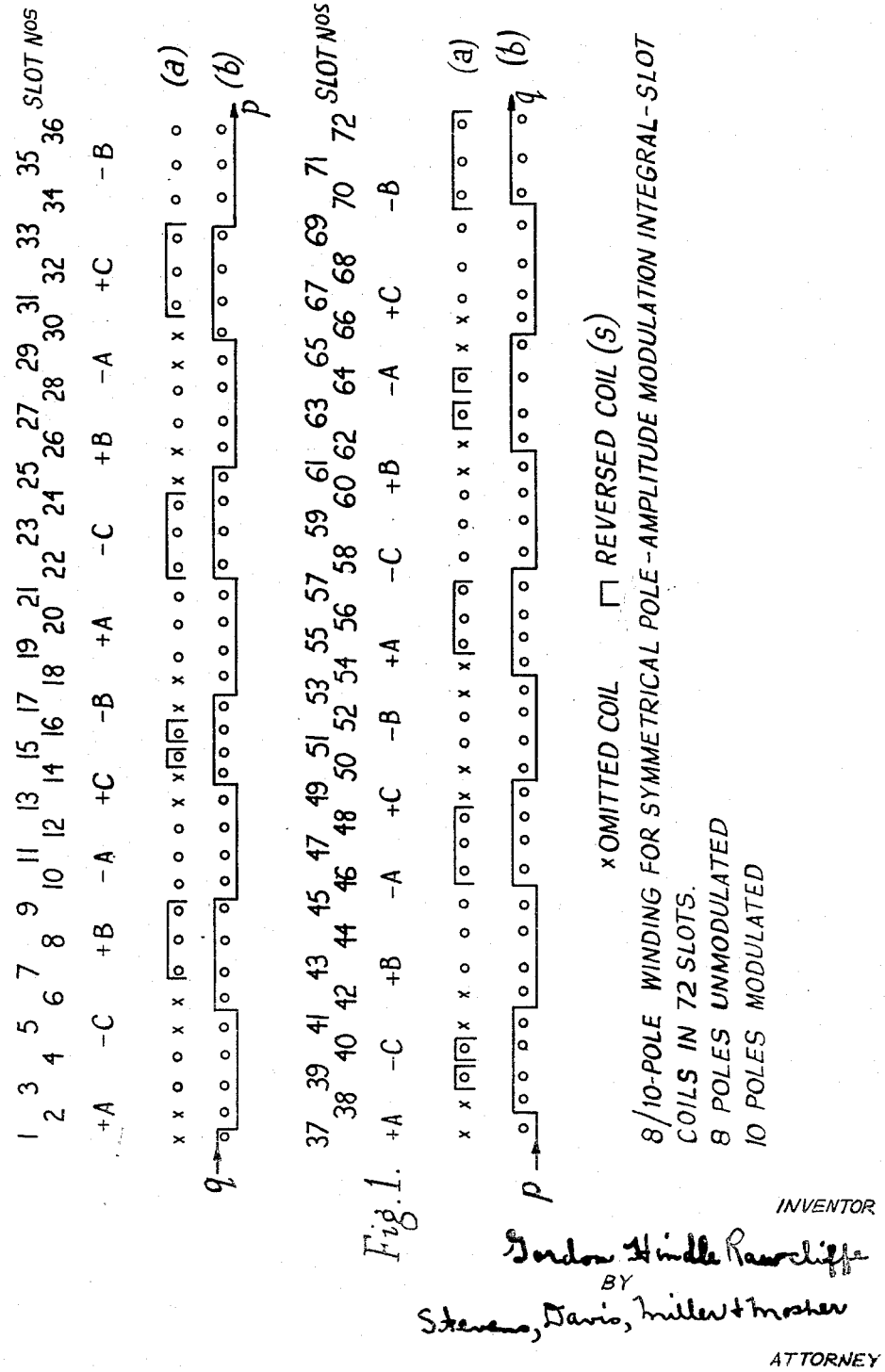
FIG. 1 is a slot-winding diagram for the three phase-windings of a 3-phase machine showing at (a) a known arrangement for pole-amplitude modulation of an 8-pole/10-pole 3-phase winding on a 72-slot frame and at (b) the corresponding pole-amplitude modulation arrangement according to the present invention.

The modulated connection of FIG. 1(a) is obtained by the reversal of whole coil-groups in the middle of consecutive half-waves of the modulation cycle, together with the reduction of end-poles of both half-waves by coil omission, according to the notation:

00+1, +3, +3, +100,     00−1, −3, −3, −100 where the "+" and "−" sign represent the relative current-carrying sense of the coils and the figure "0" represents a coil omitted from circuit.

By contrast, by the present invention, the modulated connection of FIG. 1(b) is obtained solely by the reversal of selected coils and coil-groups, according to the notation:

−1+2, +3, +3, +2−1,     +1−2, −3, −3, −2+1

It will be noted that the end coil-groups of each modulation half-wave comprise two coils connected in a first sense and one coil connected in opposite sense, to provide a resultant substantially equivalent to one coil connected in the first sense, as in FIG. 1(a).

The current-carrying sense of the coils is chosen so that the coils physically placed next to the middle coil groups of each half-wave are connected in the same sense as those middle coil-groups, whereas the outer coils of each half-wave are connected in opposite sense to all other coils of that half-wave.

Figure 2:
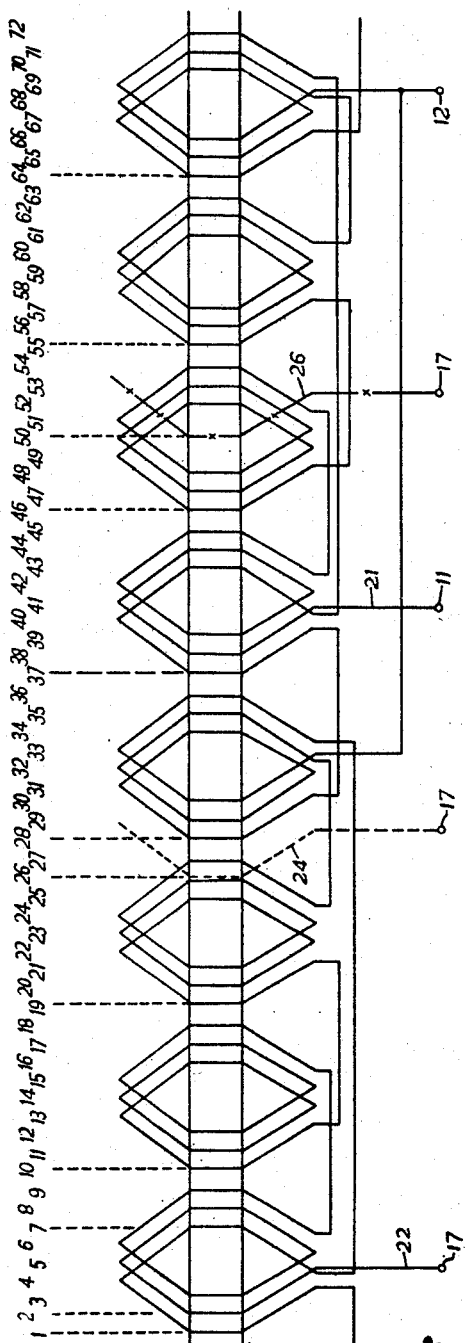
FIG. 2 is a full slot-winding diagram of one phase-winding of the machine represented in FIG. 1(b)
Figure 3:
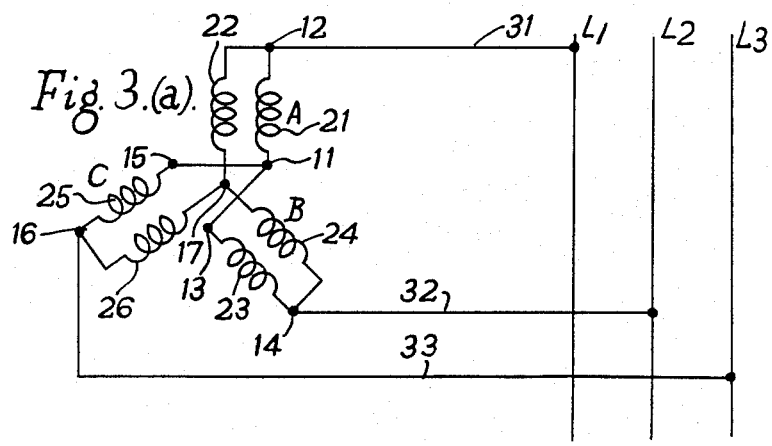
FIGS. 3(a) and 3(b) show, respectively, the parallel-star, 8-pole, unmodulated connection and the series-star, 10-pole, modulated connection of the machine of FIG. 1(b) and FIG. 2.
Figure 3:
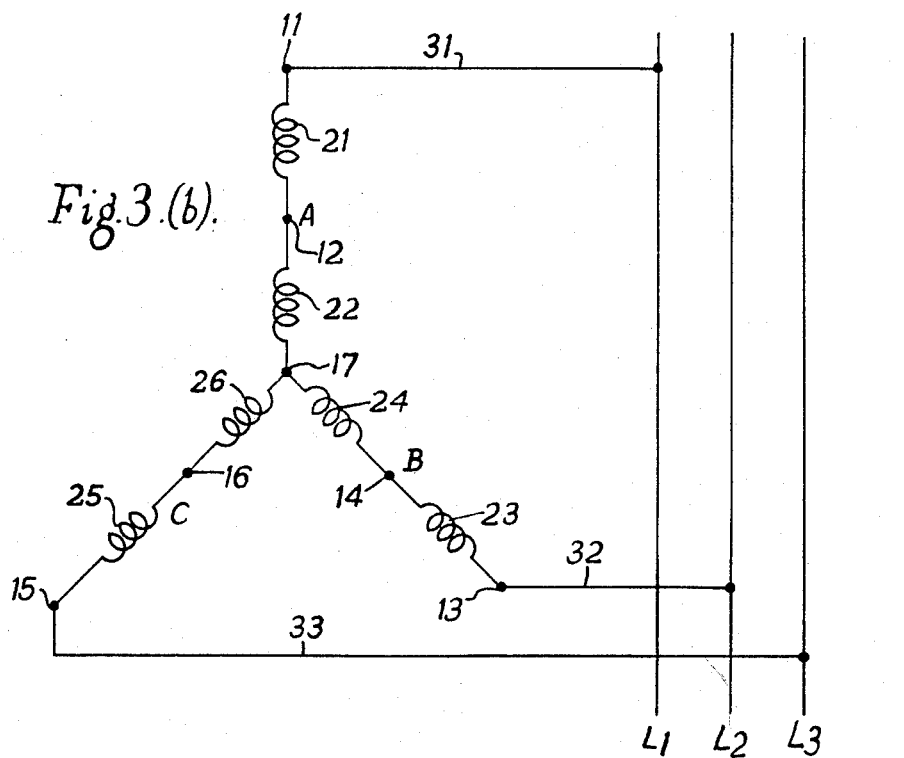

In the slot-winding diagram of FIG. 2 and in the circuit diagrams of FIGS. 3(a) and 3(b), phase-winding A comprises symmetrical halves 21, 22 serially connected between terminals 11, 12 and 17. Phase-winding B comprises the symmetrical halves 23, 24 serially connected between terminals 13, 14 and 17. Phase-winding C comprises the symmetrical halves 25, 26 serially connected between terminals 15, 16 and 17. In FIG. 2, the same terminal 17 is shown at the ends of the three phase-windings which are connected together.

In FIG. 2, only phase-winding A is shown in full. Phase-windings B and C are both identical with phase-winding A but displaced from it by 24 slots, one phase-winding in each direction. As shown in the figure, the phase-windings are wound to provide 8 poles with 3 slots per pole per phase, each coil being wound two-thirds of full pitch to 8 poles.

FIG. 3(a) shows the three phase-windings in parallel-star connection providing the lower, unmodulated, pole-number of 8 poles. Terminals 11, 13 and 15 are connected together. Terminals 12, 14 and 16 are respectively connected by leads 31, 32 and 33 to a 3-phase supply on lines $L_1$, $L_2$ and $L_3$.

FIG. 3(b) shows the three phase-windings in series-star connection providing the modulated pole-number of 10 poles. Terminals 12, 14 and 16 are isolated. Terminals 11, 13 and 15 are respectively connected by the leads 31, 32 and 33 to the 3-phase supply on lines $L_1$, $L_2$ and $L_3$.

It will be appreciated that the example described above has the lower pole-number, that is 8-poles, in the unmodulated connection and uses parallel-star/series-star alternative connections.

Often, as previously mentioned, it is preferred to reduce the pole-number by modulation and still to use the parallel-star connection for the lower pole-number. Such an example of the invention would use series-delta connection for the higher, unmodulated, pole-number and parallel-star connection for the lower, modulated, pole-number.

What I claim is:

1. A pole-changing rotary electric machine having a three-phase winding providing a first pole-number of P pole-pairs and a second pole-number selected from the pole-numbers (P+M) and (P−M) pole-pairs, where M is the number of cycles of a modulation wave around the winding circumference, having three phase-windings sequentially arranged around an axis, the electrical phase-sequence A, B, C and phase-band sequence +A −C +B −A +C −B defining a reference sense of rotation around said axis, said phase-bands comprising coils connected together in each phase-winding to provide 2P poles, switch means for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C, in the said reference sense of rotation, when said second pole-number is (P+M) pole-pairs and being in the phase sequence A, C, B, when said second pole-number is (P−M) pole-pairs, wherein neither said first pole-number nor said second pole-number is a number divisible by three, wherein the said three-phase winding is an integral-slot winding and wherein the pole-amplitude of the pole at at least one end of each half of each phase-winding is reduced in the alternative, that is to say modulated, connection, said pole-amplitude reduction being effected by reversal in current-carrying sense of selected coils relatively to all the remaining coils of the coil-groups providing said poles of reduced amplitude, whereby all coils of all phase-bands are included in circuit for both the first and the alternative connections.

2. A rotary electric machine as claimed in claim 1, in which, in each phase winding, said P pole-pairs of said first pole-number divided by the 2M half-cycles of said pole-amplitude modulation wave provides a number of poles in each half-cycle exceeding three poles and at least one of the first and last poles of said number of poles is reduced in amplitude in the alternative, that is to say modulated, connection.

3. A rotary electric machine as claimed in claim 2, in which one of said first and last poles of said number of poles is reduced to substantially zero amplitude.

4. A rotary electric machine as claimed in claim 1, in which the said selected coils for reversal in current-carrying sense are selected in such manner that said selected coils are coils wound adjacent other coils of the said three-phase winding which are reversed in current-carrying sense in said alternative, that is to say modulated, connection.

5. A rotary electric machine as claimed in claim 1, in which that one of said first and alternative connections which provides the lower pole-number is a parallel-star connection of the phase-windings.

6. A rotary electric machine as claimed in claim 5, in which the said alternative, that is to say modulated, connection provides the lower pole-number, in which the connection providing P pole-pairs in a series-delta connection of the phase-windings and the alternative connection is a parallel-star connection thereof.

References Cited by the Examiner

UNITED STATES PATENTS

| | | | |
|---|---|---|---|
| 2,715,204 | 8/55 | Siskind | 318—224 |
| 2,820,938 | 1/58 | Davies | 318—224 |
| 2,850,690 | 9/58 | Rawcliffe | 318—224 |
| 3,016,482 | 1/62 | Anderson | 318—224 |
| 3,070,734 | 12/62 | Rawcliffe | 318—224 |

ORIS L. RADER, *Primary Examiner.*